United States Patent
Valecha et al.

(10) Patent No.: US 11,520,905 B2
(45) Date of Patent: Dec. 6, 2022

(54) SMART DATA PROTECTION

(71) Applicant: KYNDRYL, INC., New York, NY (US)

(72) Inventors: Vinod A. Valecha, Pune (IN); Krzysztof Rudek, Nowy Wisnicz (PL); Grzegorz Piotr Szczepanik, Cracow (PL); Lukasz Jakub Palus, Cracow (PL)

(73) Assignee: KYNDRYL, INC., New York, NY (US)

( * ) Notice: Subject to any disclaimer, the term of this patent is extended or adjusted under 35 U.S.C. 154(b) by 124 days.

(21) Appl. No.: 16/689,122

(22) Filed: Nov. 20, 2019

(65) Prior Publication Data
US 2021/0150038 A1    May 20, 2021

(51) Int. Cl.
*G06F 21/60* (2013.01)
*H04L 9/08* (2006.01)
*H04L 9/32* (2006.01)

(52) U.S. Cl.
CPC .......... *G06F 21/602* (2013.01); *H04L 9/0838* (2013.01); *H04L 9/0894* (2013.01); *H04L 9/3297* (2013.01)

(58) Field of Classification Search
CPC ... H04L 9/0838; H04L 9/0894; H04L 9/3297; G06F 21/602
See application file for complete search history.

(56) References Cited

U.S. PATENT DOCUMENTS

| | | | |
|---|---|---|---|
| 9,576,147 B1* | 2/2017 | McClintock | H04L 63/0428 |
| 9,749,193 B1 | 8/2017 | Rokicki | |
| 9,852,303 B2 | 12/2017 | Feng et al. | |
| 10,169,251 B1* | 1/2019 | Whelihan | G06F 21/00 |
| 10,298,545 B2 | 5/2019 | Boivie et al. | |
| 2008/0147992 A1 | 6/2008 | Raikin et al. | |
| 2012/0331284 A1* | 12/2012 | Kouladjie | H04L 9/088 |
| | | | 713/153 |
| 2014/0075193 A1 | 3/2014 | Wang | |
| 2017/0134160 A1 | 5/2017 | Onoda | |

(Continued)

FOREIGN PATENT DOCUMENTS

| CN | 1486014 A | 3/2004 |
|---|---|---|
| CN | 103502994 A | 1/2014 |

(Continued)

OTHER PUBLICATIONS

Vasily Sartakov • Nico Weichbrodt • Sebastian Krieter • Thomas Leich • Rudiger Kapitza; STANlite—A Database Engine for Secure Data Processing at Rack-Scale Level; 2018 IEEE International Conference on Cloud Engineering (IC2E) (pp. 23-33); (Year: 2018).*

(Continued)

*Primary Examiner* — Luu T Pham
*Assistant Examiner* — Chao Wang
(74) *Attorney, Agent, or Firm* — John Kennel; Andrew M. Calderon; Calderon Safran & Cole P.C.

(57) ABSTRACT

When a system receives sensitive data, it can request an encryption key from an encryption/decryption unit. A central processing unit (CPU) of the system can encrypt the sensitive data using the encryption key before writing the sensitive data to memory. Thus, the sensitive data is encrypted when written to memory.

14 Claims, 6 Drawing Sheets

(56) References Cited

U.S. PATENT DOCUMENTS

2017/0193031 A1* 7/2017 Papapanagiotou ..........................
                                                              G06F 11/1451
2018/0011802 A1   1/2018 Ndu et al.
2018/0167204 A1*  6/2018 Wall ........................ H04L 63/06
2018/0357093 A1* 12/2018 Cong .................. G06F 21/6281

FOREIGN PATENT DOCUMENTS

| | | |
|---|---|---|
| CN | 106485155 A | 3/2017 |
| CN | 107609418 A | 1/2018 |
| CN | 110472445 A | 11/2019 |
| JP | 2018055555 A | 4/2018 |
| WO | 2006009616 A2 | 1/2006 |
| WO | 2013002789 A1 | 1/2013 |
| WO | 2018213744 A2 | 11/2018 |

OTHER PUBLICATIONS

Christian Priebe • Kapil Vaswani • Manuel Costa; EnclaveDB: A Secure Database Using SGX; 2018 IEEE Symposium on Security and Privacy (SP) (pp. 264-278); (Year: 2018).*

Shay Gueron; Memory Encryption for General-Purpose Processors; IEEE Security & Privacy (vol. 14, Issue: 6, pp. 54-62); (Year: 2017).*

Mell et al., "The NIST Definition of Cloud Computing," Recommendations of the National Institute of Standards and Technology, U.S. Department of Commerce, Special Publication 800-145, Sep. 2011, 7 pages.

* cited by examiner

SMART DATA PROTECTION

BACKGROUND

The present disclosure relates to software, and more specifically, to encryption of sensitive data in live memory.

Throughout different fields, a common critical concern is the importance of maintaining security and/or controlling access to sensitive data. For example, sensitive data may include personally identifying information (PII), health information, financial data, etc. To accomplish this, many computerized applications that utilize sensitive data may encrypt the sensitive data when storing it in long-term storage, such as on a hard disk drive (HDD). When an example application needs to use the data, it may retrieve the encrypted data from storage, decrypt it, and then utilize the decrypted sensitive data to perform whatever operations are required (such as processing an online payment with a user's credit card information).

Many typical computer systems may have the capability to generate a "memory dump," which is often a compilation of some or all data stored in memory. For example, some systems may automatically dump contents of memory to a file when an application crashes or otherwise fails. The contents of the memory at the time of the crash may assist in discerning why the application failed. However, if sensitive data is being stored in memory at the time of the dump, it may be written to file as well, enabling unauthorized access or disclosure. Sophisticated attackers may take advantage of this to acquire sensitive data without access.

SUMMARY

Some embodiments of the present disclosure can be illustrated as a method. The method may include receiving sensitive data, requesting an encryption key from a key manager, and receiving the encryption key. The encryption key may be associated with the sensitive data. The method may also include encrypting the sensitive data using the encryption key and writing the encrypted sensitive data to live memory. This advantageously encrypts the sensitive data before it is written to live memory.

Some embodiments of the present disclosure can be illustrated as the method described above, with the additional step of retrieving the encrypted sensitive data from the memory. This method may also include requesting a decryption key from the key manager, where the decryption key is associated with the sensitive data, receiving the decryption key, and decrypting the encrypted sensitive data using the decryption key. This advantageously enables usage of sensitive data even if it is stored in live memory in an encrypted state.

Some embodiments of the present disclosure can also be illustrated as a computer program product comprising a computer readable storage medium having program instructions embodied therewith, the program instructions executable by a computer to cause the computer to perform the methods discussed above. Such a computer program product advantageously enhances security over the prior art by encrypting sensitive data before the data is written to live memory, increasing resilience to core dump or similar attacks.

Some embodiments of the present disclosure can be illustrated as a system. The system may comprise memory and a central processing unit (CPU). The CPU may be configured to receive sensitive data and determine an encryption key. The encryption key may be associated with the sensitive data. The CPU may also be configured to encrypt the sensitive data based on the encryption key and write the encrypted sensitive data to the live memory. This advantageously enables the system to store sensitive data in live memory in an encrypted state, increasing security and mitigating risks of a core dump or similar attack.

Some embodiments of the present disclosure can be illustrated as a system such as the system described above, where the CPU is further configured to retrieve the encrypted sensitive data from memory and determine a decryption key. The decryption key may be associated with the sensitive data. The CPU may also be configured to decrypt the sensitive data using the decryption key. This advantageously enables usage of the sensitive data even if it is stored in an encrypted state in live memory.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and are not intended to limit the disclosure. Features and advantages of various embodiments of the claimed subject matter will become apparent as the following Detailed Description proceeds, and upon reference to the drawings, in which like numerals indicate like parts, and in which:

While this disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure relate to a system and method to secure sensitive data in live memory. More particular aspects relate to a system to receive input of sensitive data and cause the sensitive data to be encrypted before it is saved to live memory to prevent unencrypted sensitive data from being stored in live memory.

While sensitive data is frequently encrypted in storage (such as on a hard disk drive (HDD)), in practice many applications temporarily store the unencrypted sensitive data in live memory, such as random access memory (RAM). These applications may rely upon the volatile nature of RAM to protect the security of the sensitive data; even though the sensitive data is stored unencrypted in the live memory, it may be overwritten or otherwise lost shortly after an application has completed utilizing it.

However, attackers have become increasingly sophisticated, and may now be capable of determining values of variables stored in live memory. For example, one method employed by attackers may include triggering a core dump, causing the contents of live memory to be written to a file. If sensitive data is stored unencrypted in live memory, such an operation may result in the unencrypted sensitive data becoming readily available to an attacker.

Throughout this disclosure, reference is made to "live memory." As used herein, "live memory" may refer to one or more non-transitory computer-readable storage media such as, for example, random access memory (RAM). In practice, data received by a computing system may be stored in live memory for a period during which the computing system may require access to the data.

Throughout this disclosure, reference is made to "sensitive data." As used herein, "sensitive data" may refer to any data whose security is considered significant by an application developer, user, or proprietor. For example, "sensitive data" may include: personally identifying information (PII) such as social security numbers, residential addresses, etc.; healthcare information such as medical history; and financial information such as credit card numbers, bank account numbers, salary information, etc. Maintaining security and integrity of sensitive data (for example, preventing unauthorized access to the sensitive data) may be considered paramount in many different fields.

Throughout this disclosure, reference is made to one or more "instances" of sensitive data. As used herein, an "instance" of sensitive data refers to what the sensitive data represents (e.g., a bank password, a credit card number, a residential address, etc.) as opposed to the stored bits. For example, a first "instance" of sensitive data may be a first user's bank password, while a second sensitive data instance may be the first user's residential address. If the first user's bank password is stored in multiple locations (for example, several different hard disk drives), for purposes of this disclosure these are all still referred to as the first "instance" of sensitive data. If a second user's bank password is coincidentally identical to the first user's bank password, the second user's bank password is still referred to as a third "instance" of sensitive data.

Throughout this disclosure, reference is made to "encryption" and "decryption." As used herein, "encryption" may include symmetric key encryption. The encryption may comply with one or more encryption standards including, for example, Advanced Encryption Standard (AES, such as AES-192, AES-256, etc.). Encryption includes one or more "keys," which may be generated or stored by a key manager. Multiple encryption keys may be used; in some embodiments, encryption keys may be specific to particular categories (or "types") of data. In some embodiments, each instance of sensitive data may have its own unique key associated with that instance. In some embodiments, encrypted data may be decrypted using the same key with which the data was encrypted. In some embodiments, decryption may first involve transforming the original encryption key into a decryption key, then using the decryption key to decrypt the encrypted data.

As used herein, an encryption key being "associated with" an instance of sensitive data means that the encryption key is used to encrypt that instance of sensitive data, and a decryption key to decrypt that instance of sensitive data may be determined based on that encryption key. In some embodiments, encryption keys are associated with each instance of sensitive data of a particular type. For example, a first encryption key may be associated with "credit card numbers," in which case each instance of sensitive data of the type "credit card number" may be associated with the first encryption key. In some embodiments, each instance of sensitive data may be associated with a distinct encryption key. For example, a first instance of sensitive data may be associated with a first encryption key, while a second instance of sensitive data may be associated with a second encryption key. In some embodiments, association between keys and instances of sensitive data may be tracked, defined, or otherwise determined via an encryption key database, such as an array. For example, an array of an encryption key database may include one or more rows, wherein each row identifies a type of sensitive data and any encryption key associated with that type of sensitive data. "Associated," as used herein, is two-way; a key being associated with an instance of sensitive data can also be described by the statement that the instance of sensitive data is associated with the encryption key.

In some embodiments, protection of sensitive data may occur at the "code level." As used herein, "code level" may refer to a stage of software development and execution wherein source code is written and edited. For example, in some embodiments, sensitive data may be specified as a particular data type or object type in source code of an application. In some embodiments, implementing this data protection at "code level" may involve a modification to an existing programming language, such as Java, C++, etc., to support the additional "sensitive" data type. An application may be compiled into computer-executable instructions, wherein executing those instructions may cause a computer system to perform one of the methods described in this disclosure.

Figure 1:
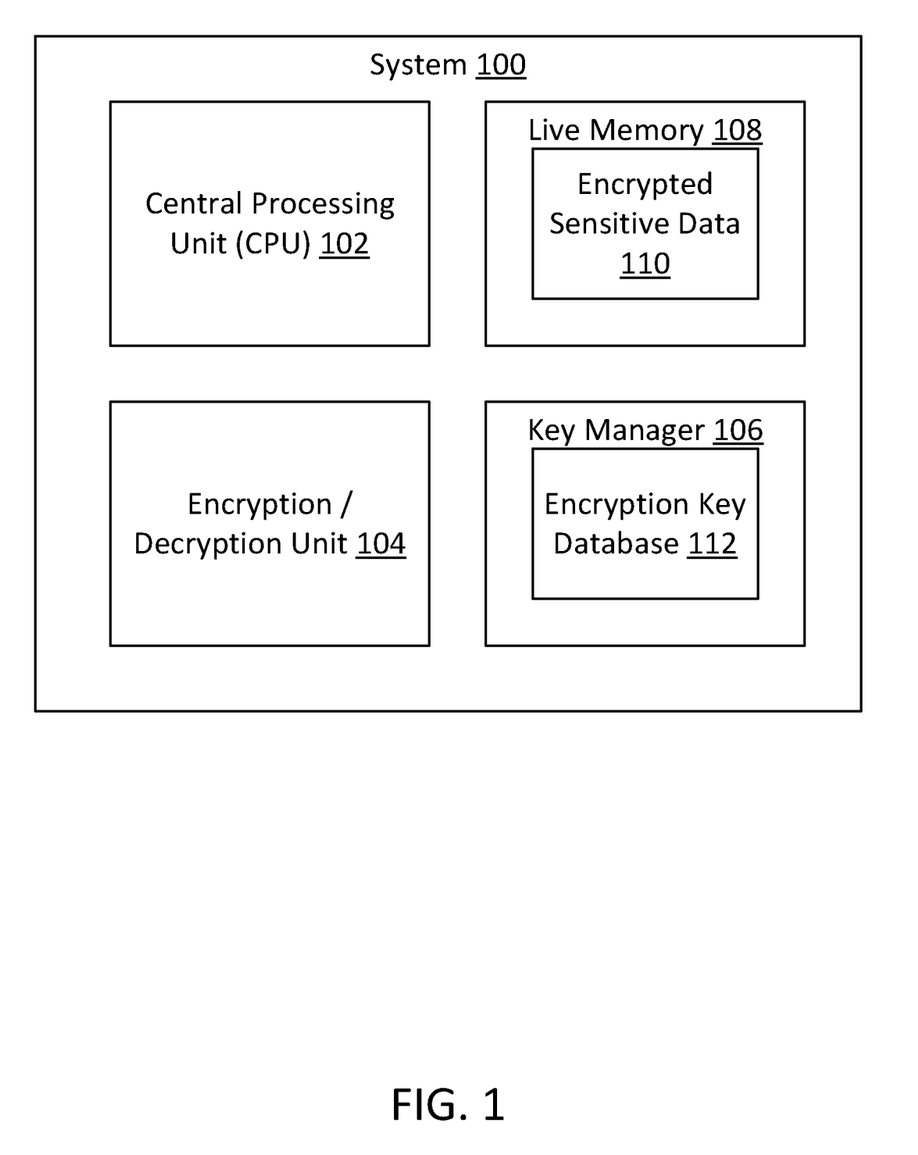
FIG. 1 illustrates a system for protecting sensitive data in live memory.

FIG. 1 illustrates a system 100 for protecting sensitive data in live memory consistent with embodiments of the present disclosure. System 100 includes central processing unit (CPU) 102, encryption/decryption unit (EDU) 104, key manager 106 and live memory 108. In some embodiments, EDU 104 and key manager 106 are included within CPU 102. In some embodiments, some components of system 100 such as, for example, key manager 106, are located elsewhere on a machine or server blade, connected to CPU 102 and/or EDU 104 via one or more buses. When sensitive data is input into system 100, CPU 102 sends the sensitive data to EDU 104 for encryption via an encryption key.

EDU 104 may retrieve the encryption key from key manager 106. In some embodiments, key manager 106 may be configured to generate an encryption key. In some embodiments, key manager 106 may store one or more encryption keys. In some embodiments in which key manager 106 stores at least one key, one or more of the stored encryption keys may be preinstalled or otherwise originate from an external source (i.e., not generated directly by key manager 106). In some embodiments, the sensitive data may be tagged as a particular type of sensitive data. For example, sensitive data may be linked to a tag that labels the sensitive data as a credit card number, a social security number, a residential address, etc. In some embodiments, the tag may be received alongside the sensitive data when the sensitive data is first input to the system, at which point the instance of sensitive data may be linked to the tag such that, whenever the sensitive data is sent to another component, the tag is sent with it. In some embodiments, key manager 106 may selected or generate an encryption key based on a type of sensitive data. For example, sensitive data identified as a credit card number type may be associated with a first encryption key, while sensitive data identified as a residential address type may be associated with a second, possibly different encryption key.

In some embodiments, CPU 102 may request a key directly from key manager 106. Once key manager 106 receives a key request (including, in some embodiments, a sensitive data type), it determines, selects, or generates an encryption key based on the request (and, in some embodiments, based on the sensitive data type).

Key manager 106 includes a database of encryption keys 112. Encryption key database 112 may include a number of encryption keys associated with sensitive data. In some embodiments, each key in encryption key database 112 may be associated with a specific type of sensitive data. For example, a first encryption key stored in encryption key database 112 may be associated with credit card numbers, while a second encryption key stored in encryption key database 112 may be associated with residential addresses, and so on for various different types of sensitive data. In some embodiments, some encryption keys may be used for more than one sensitive data type (for example, the first encryption key stored in encryption key database 112 may be associated with credit card numbers and with social security numbers).

In some embodiments, encryption key database 112 includes a list of sensitive data types and initially does not include any encryption keys, and when key manager 106 receives a request for an encryption key associated with a sensitive data type for which no encryption key is currently stored, key manager 106 may generate and store a new encryption key associated with the requested sensitive data type before returning the new encryption key to the requester.

In some embodiments, encryption key database 112 further includes a timestamp to identify an "age" for some or all encryption keys stored therein. For example, in some embodiments, each entry of encryption key database 112 includes a timestamp identifying the first date and time the corresponding encryption key was used to encrypt sensitive data. In some embodiments, encryption keys are associated with multiple instances of sensitive data; in such cases, the timestamp may refer to the "oldest" date and time the corresponding encryption key was used to encrypt any instance of sensitive data with which it is associated. Whenever a request for an encryption (or, in some embodiments, decryption) key is received at key manager 106, key manager 106 may compare a current time and date to the time and date identified in the timestamp to determine an age of the encryption key. Key manager 106 may further compare the age to a threshold age, wherein the threshold age may also be stored in encryption key database 112. If the encryption key age is over the threshold, key manager 106 may update the encryption key. To update the key, key manager 106 may generate a new encryption key for the associated instance and update the timestamp to the current time and date. Key manager 106 may also return the new encryption key in response to the request. If the request is for a decryption key and key manager 106 determines that the associated encryption key is over the age threshold, key manager 106 may return the current (i.e., "old") decryption key before updating the encryption key.

In some embodiments, some encryption keys may have different age thresholds than other encryption keys. For example, a "social security number" encryption key may have an age threshold of one year, while an "residential address" encryption key may have an age threshold of two years. In some embodiments, if key manager 106 determines that an encryption key is over the associated age threshold, key manager 106 may update multiple encryption keys stored in encryption key database 112, even including keys not associated with a current request. For example, if key manager 106 receives a request for a "social security number" key and determines that the SSN key is over the SSN key age threshold, key manager 106 may update both the SSN key and an unrelated "residential address" key. In some embodiments, key manager 106 may return the new SSN key before updating other keys, while in some embodiments, key manager 106 may update multiple keys before returning the new requested key.

In some embodiments, some encryption keys may share an age threshold. For example, in some embodiments, a first key associated with a "credit card number" sensitive data type and a second key associated with a "residential address" sensitive data type may share an age threshold of one year, while a third key associated with a "social security number" sensitive data type may have an age threshold of three years. In some embodiments, all encryption keys may share the same age threshold. In some embodiments, the age threshold(s) may be based on a cryptographic standard such as, for example, AES-256.

In some embodiments, key manager 106 may store a different encryption key for each instance of sensitive data. As used herein, an "instance" of sensitive data is used to describe a unit of sensitive data to be utilized and/or encrypted; a request to encrypt sensitive data is associated with a single "instance" of sensitive data. Rather than determine or identify a type of the sensitive data, key manager 106 may receive an identifier to distinguish between sensitive data instances that have been encrypted before via system 100 and new sensitive data instances. For example, one or more of CPU 102 or EDU 104 may perform a hash function on the sensitive data and send the hash of the unencrypted sensitive data to key manager 106, such that key manager 106 may store the hash of the sensitive data in encryption key database 112. This may enable key manager 106 to determine if the sensitive data is identical to a previously-encountered sensitive data by comparing the received hash to the hashes stored in encryption key database 112. In some embodiments, rather than hashing the sensitive data, each instance of sensitive data may be assigned an identifying number (e.g., "sensitive data 001," "sensitive data 002," and so on). In some embodiments, key manager 106 may simply be sent the unencrypted sensitive data itself. Regardless of the identifier used, key manager 106 may store the encryption keys, sensitive data identifier, and/or key age for each instance of sensitive data in encryption key database 112.

Key manager 106 sends the encryption key either to CPU 102 or directly to EDU 104. If key manager 106 sends the encryption key to CPU 102, CPU 102 may send it, along with the sensitive data, to EDU 104. EDU 104 uses the encryption key to encrypt the sensitive data into encrypted sensitive data 110. EDU 104 may return encrypted sensitive data 110 to CPU 102. CPU 102 may write encrypted sensitive data 110 to live memory 108. Thus, the unencrypted sensitive data may not be written to or stored in live memory 108, advantageously improving security of the sensitive data. If a dump of live memory 108 is triggered during operation of system 100, the unencrypted sensitive data is not written to a file.

Figure 2:
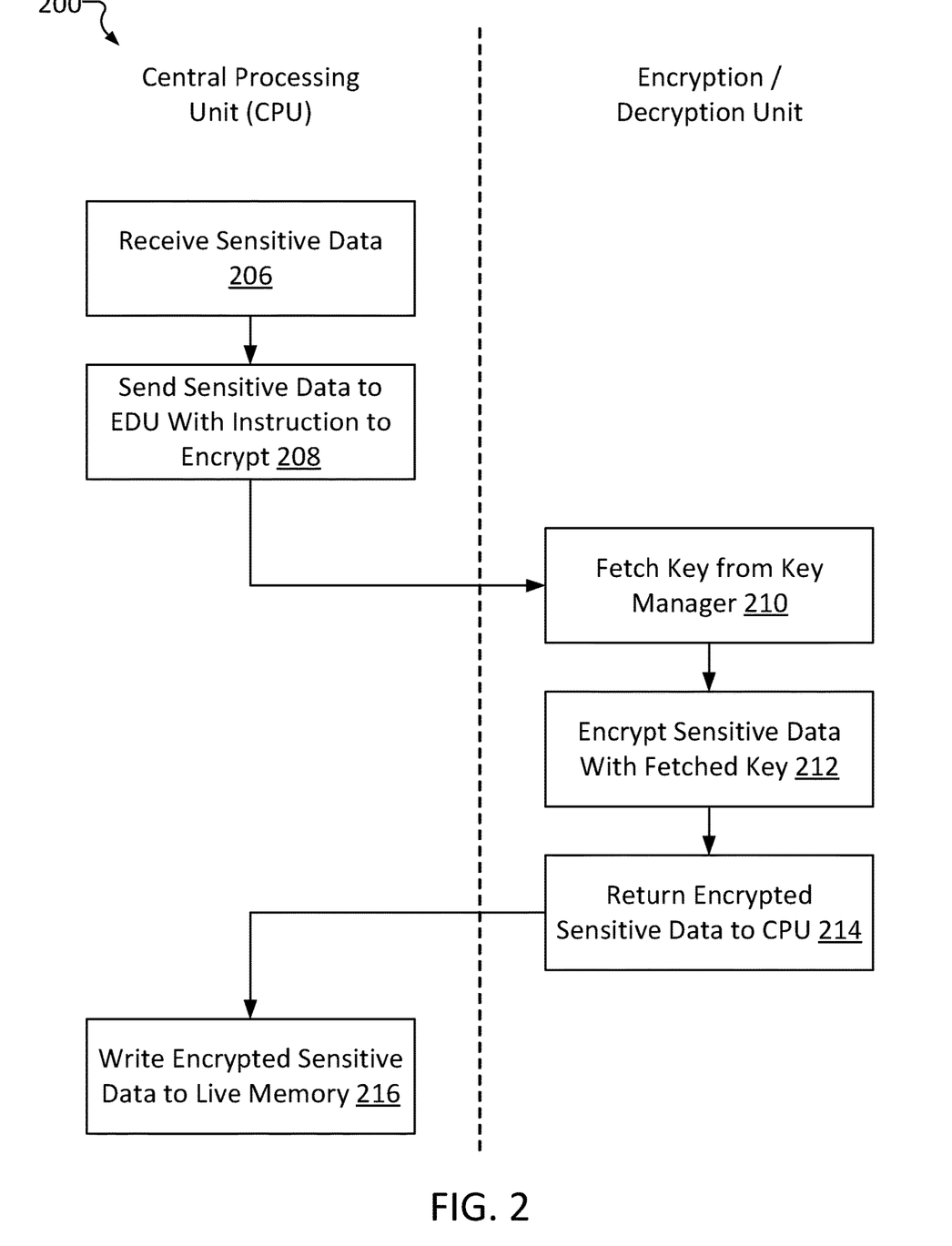
FIG. 2 illustrates a method for encrypting sensitive data before saving it to live memory.

FIG. 2 illustrates a method 200 for encrypting sensitive data before saving it to live memory. Method 200 is illustrated in a "swimlane diagram" format. This indicates that, unless otherwise noted, operations depicted in the "Central Processing Unit" lane are, in method 200, performed by a CPU (such as, for example, CPU 102) and operations depicted in the "Encryption/Decryption Unit" lane are performed by an EDU (such as, for example, EDU 104).

Method 200 includes receiving sensitive data 206. This may be in response to, for example, a user entering a credit card number into a system for later use in a financial transaction. Method 200 further includes sending the sensitive data to an EDU with instructions to encrypt the sensitive data 208. In some embodiments, the instructions to encrypt the sensitive data may include information identifying a type of the sensitive data. Method 200 further includes fetching a key from a key manager 210. This may include, for example, an EDU such as EDU 104 sending a request to a key manager such as key manager 106. The request may include information related to the sensitive data, such as type-identifying information. The key manager may utilize this information in selecting, generating, or determining an encryption key. For example, the key manager may select a key from a list of stored keys based on an identified type of the sensitive data. In some embodiments, the key manager may generate a new key based on the type of the data. In some embodiments, the key manager may generate a new key for every new instance of sensitive data. The key manager may then return the encryption key to the EDU. In some embodiments, a CPU may perform operation 210, rather than an EDU.

Method 200 further includes encrypting the sensitive data with the encryption key. This may be performed by, for example, an EDU such as EDU 104. In some embodiments, the sensitive data is encrypted via an established encryption standard such as, for example, AES-256. Method 200 further includes returning the encrypted sensitive data to the CPU 214. Method 200 further includes writing the sensitive data to live memory 216. This may include, for example, a CPU such as CPU 102 writing the encrypted sensitive data such as encrypted sensitive data 110 to memory such as live memory 108, advantageously improving security over prior art systems. In some embodiments, a tag is stored with the encrypted sensitive data. This tag may include, for example, sensitive data type information, a sensitive data instance identifier, a sensitive data hash, etc. The tag may be used later to determine a decryption key when decrypting the encrypted sensitive data, such as during method 300 described with reference to FIG. 3, below.

Figure 3:
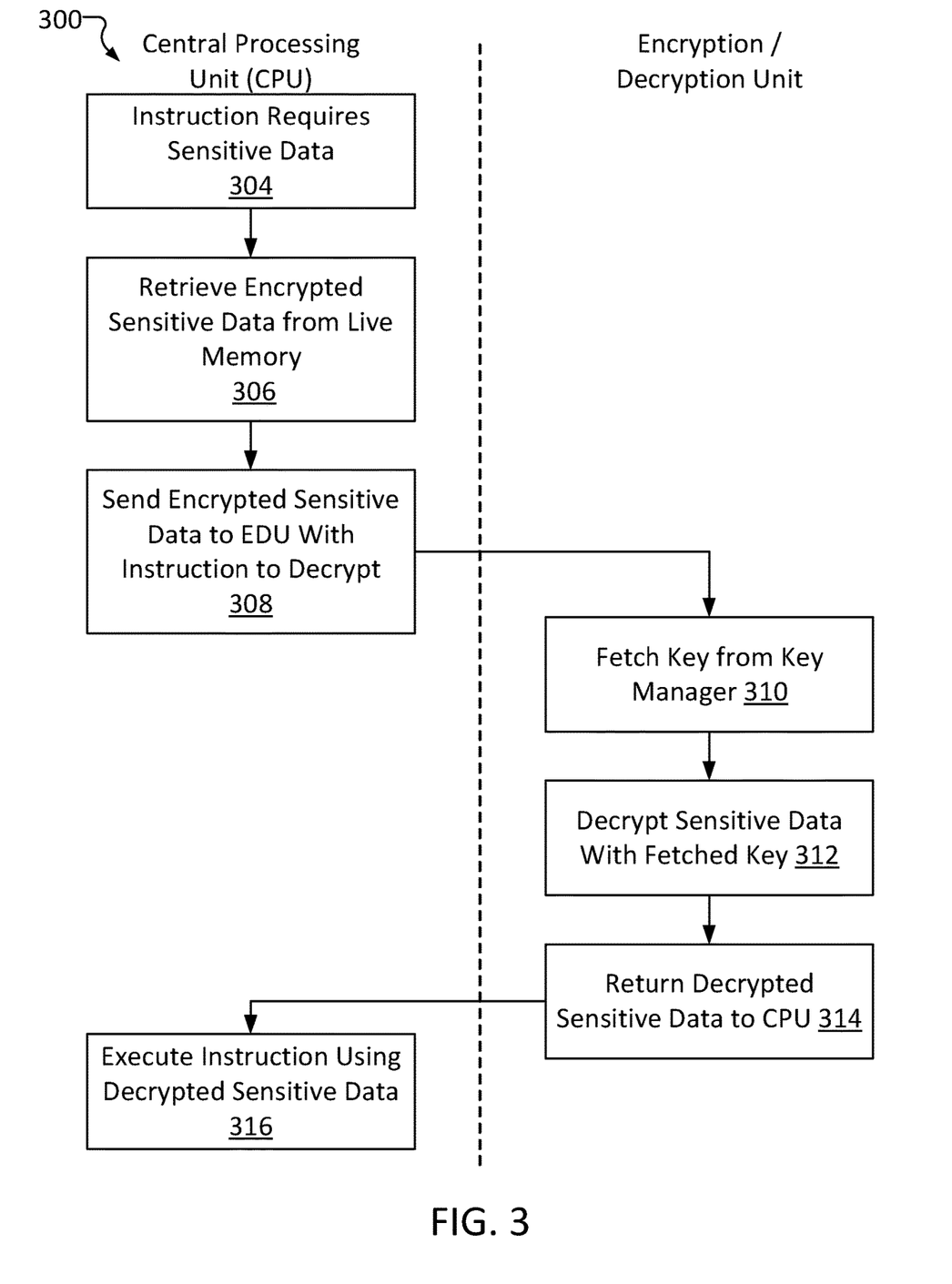
FIG. 3 illustrates a method for retrieving sensitive data from live memory and decrypting it for use in operation.

FIG. 3 illustrates a method 300 for retrieving sensitive data from live memory and decrypting it for use in operation. Method 300 is illustrated in a "swimlane diagram" format. This indicates that, unless otherwise noted, operations depicted in the "Central Processing Unit" lane are to be performed by a CPU (such as, for example, CPU 102) and operations depicted in the "Encryption/Decryption Unit" lane are to be performed by an EDU (such as, for example, EDU 104).

Method 300 includes receiving an instruction, the instruction requiring sensitive data 304. This instruction may be, for example, a part of a financial transaction wherein the sensitive data includes a credit card number. Method 300 further includes retrieving encrypted sensitive data from live memory 306. This may include, for example, a CPU such as CPU 102 retrieving encrypted sensitive data such as that written to live memory at operation 216 of FIG. 2, from live memory 108. Method 300 further includes sending the encrypted sensitive data to an EDU with instructions to decrypt the encrypted sensitive data 308. In some embodiments, the instructions to decrypt the encrypted sensitive data may include a tag, the tag including information to identify which instance of sensitive data is to be decrypted. The tag could identify a type of the sensitive data, an identifier or index associated with the sensitive data, a hash of the unencrypted sensitive data, etc.

Method 300 further includes fetching a key from a key manager 310. This may include, for example, an EDU such as EDU 104 sending a request to a key manager such as key manager 106. The request may include information related to the sensitive data, such as type identifying information, a sensitive data identifier, etc. The key manager may utilize this information in selecting, generating, or determining a decryption key. In some embodiments, the decryption key may be identical to an encryption key used to encrypt the sensitive data (such as during operation 212 of FIG. 2). In some embodiments, the decryption key may be different from but based on the encryption key. This may depend upon the encryption method used when encrypting the sensitive data (such as during method 200). In some embodiments, the decryption key may be stored in an encryption key database such as, for example, encryption key database 112. For example, the key manager may select a key from a list of stored keys based on an identified type of the sensitive data. In some embodiments, the decryption key is never stored in the encryption key database, and instead is generated based on the stored encryption key each time the decryption key is requested. In some embodiments, if no decryption key associated with the sensitive data, sensitive data type, or encryption key is currently stored, a new decryption key is generated based on the encryption key. The new decryption key may be stored in the encryption key database or it may be discarded once it is returned. The key manager may then return the decryption key to the EDU. In some embodiments, a CPU may perform operation 310, rather than an EDU. Thus, in some embodiments, the key manager may return the decryption key to the CPU rather than the EDU.

Method 300 further includes decrypting the sensitive data with the decryption key. This may be performed by, for example, an EDU such as EDU 104. In some embodiments, the sensitive data may be decrypted according to an established encryption standard such as, for example, AES-256. Method 300 further includes returning the decrypted sensitive data to the CPU 314. Method 300 further includes executing the instruction using the decrypted sensitive data 316. This may include, for example, a CPU such as CPU 102 executing the instruction received at 304 using the decrypted sensitive data 316. Method 300 advantageously enables usage of sensitive data even if it is encrypted while stored in live memory.

A cloud computing environment is service oriented with a focus on statelessness, low coupling, modularity, and semantic interoperability. At the heart of cloud computing is an infrastructure that includes a network of interconnected nodes.

Figure 4:
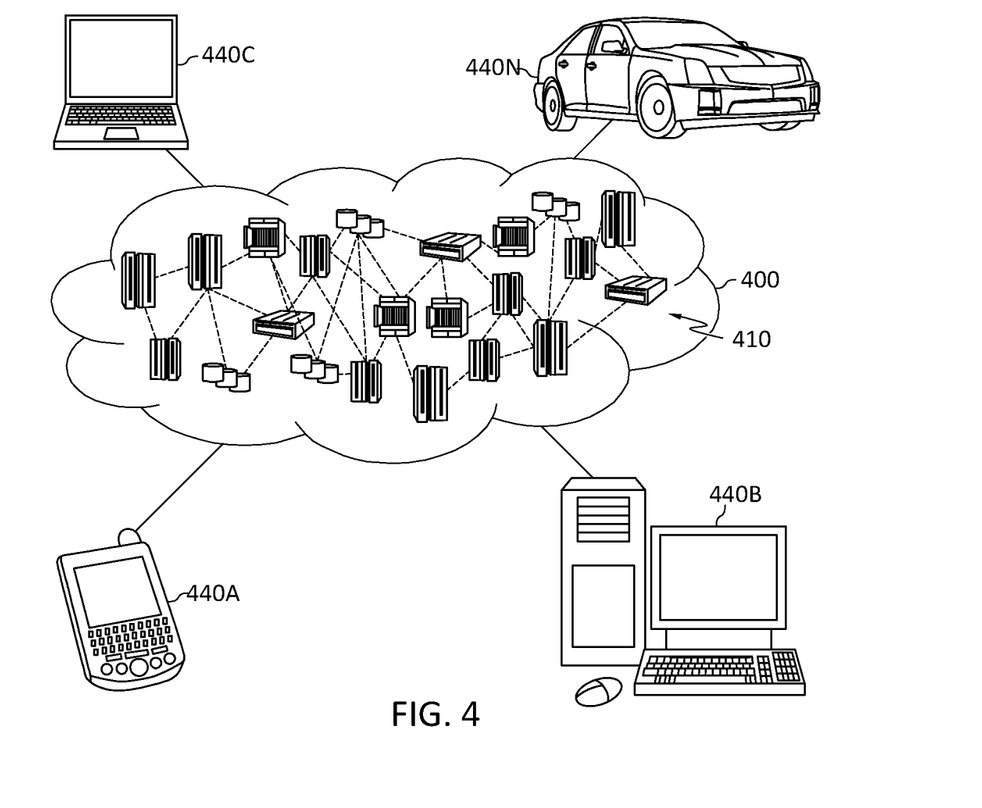
FIG. 4 depicts a cloud computing environment according to an embodiment of the present disclosure.

Referring now to FIG. 4, illustrative cloud computing environment 400 is depicted. As shown, cloud computing environment 400 comprises one or more cloud computing nodes 410 with which local computing devices used by cloud consumers, such as, for example, personal digital assistant (PDA) or cellular telephone 440A, desktop computer 440B, laptop computer 440C, and/or automobile computer system 440N may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 440A-N shown in FIG. 4 are intended to be illustrative only and that computing nodes 410 and cloud computing environment 400 can communicate with any type of computerized device over any type of network and/or network addressable connection (e.g., using a web browser).

Figure 5:
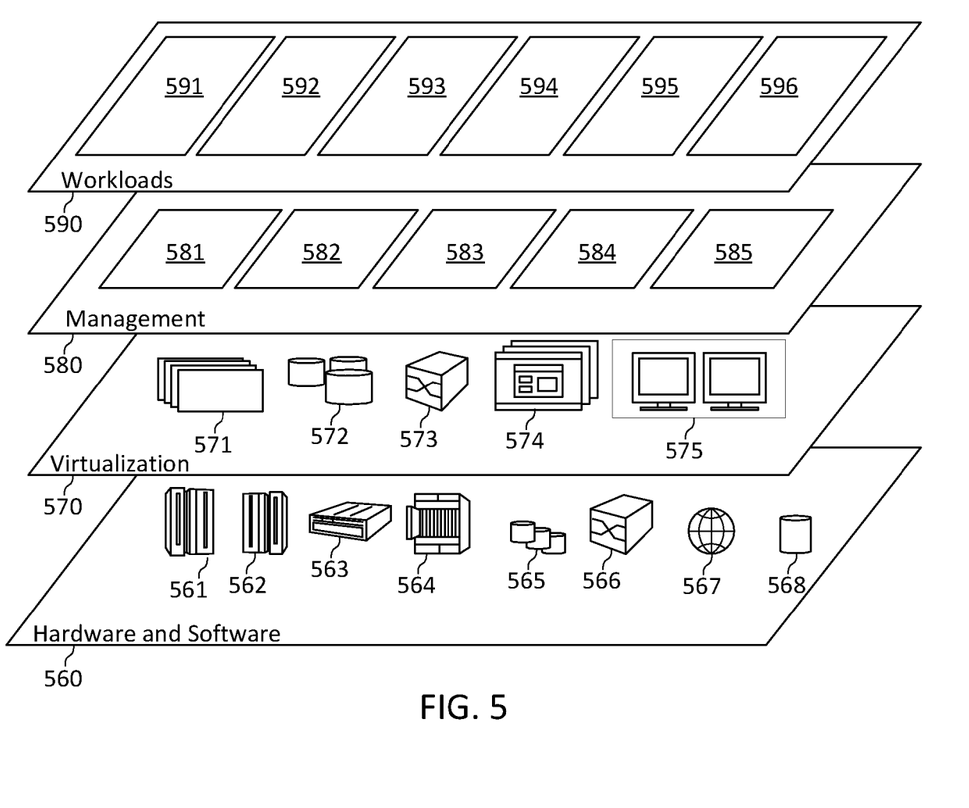
FIG. 5 depicts abstraction model layers according to an embodiment of the present disclosure.

Referring now to FIG. 5, a set of functional abstraction layers provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: mapping and navigation 591; software development and lifecycle management 592; virtual classroom education delivery 593; data analytics processing 594; transaction processing 595; and sensitive data encryption 596.

Figure 6:
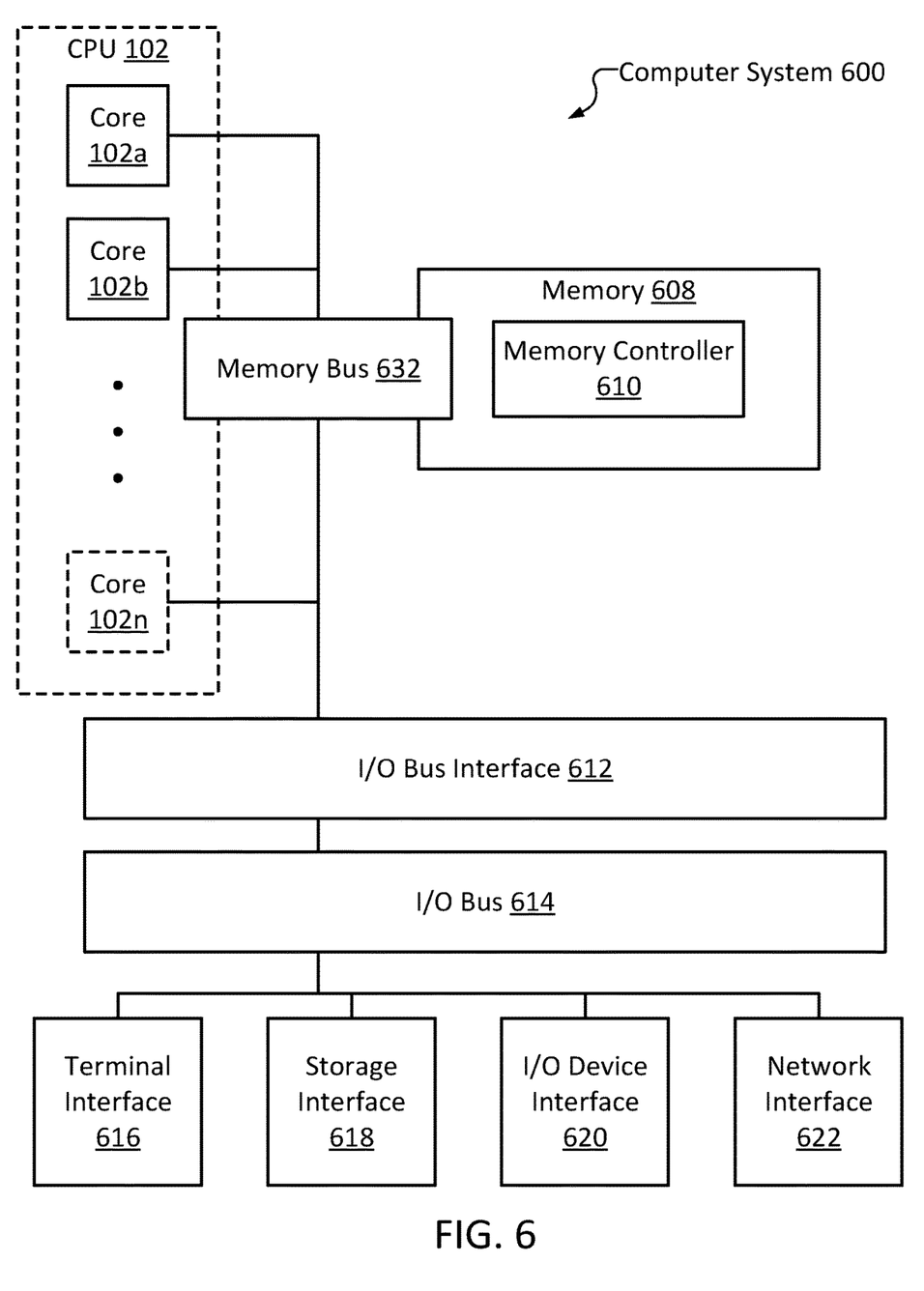
FIG. 6 illustrates a high-level block diagram of an example computer system that may be used in implementing embodiments of the present disclosure.

Referring now to FIG. 6, shown is a high-level block diagram of an example computer system 600 that may be configured to perform various aspects of the present disclosure, including, for example, methods 200 and 300. The example computer system 600 may be used in implementing one or more of the methods or modules, and any related functions or operations, described herein (e.g., using one or more processor circuits or computer processors of the computer), in accordance with embodiments of the present disclosure. In some embodiments, the major components of the computer system 600 may comprise a CPU 102 with one or more CPU cores 604, a memory subsystem 608, a terminal interface 616, a storage interface 618, an I/O (Input/Output) device interface 620, and a network interface 622, all of which may be communicatively coupled, directly or indirectly, for inter-component communication via a memory bus 632, an I/O bus 614, and an I/O bus interface unit 612.

The computer system 600 may contain one or more general-purpose programmable central processing units (CPUs) 102, some or all of which may include one or more cores 104a, 104b, and 104n, herein generically referred to as the CPU 602. In some embodiments, the computer system 600 may contain multiple processors typical of a relatively large system; however, in other embodiments the computer system 600 may alternatively be a single CPU system. Each CPU 102 may execute instructions stored in the memory subsystem 608 on a CPU core 104 and may comprise one or more levels of on-board cache.

In some embodiments, the memory subsystem 608 may comprise a random-access semiconductor memory, storage device, or storage medium (either volatile or non-volatile) for storing data and programs. In some embodiments, the memory subsystem 608 may include live memory 108. In some embodiments, the memory subsystem 608 may represent the entire virtual memory of the computer system 600 and may also include the virtual memory of other computer systems coupled to the computer system 600 or connected via a network. The memory subsystem 608 may be conceptually a single monolithic entity, but, in some embodiments, the memory subsystem 608 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 608 may contain elements for control and flow of memory used by the CPU 102. This may include a memory controller 610.

Although the memory bus 632 is shown in FIG. 6 as a single bus structure providing a direct communication path among the CPU 102, the memory subsystem 608, and the I/O bus interface 612, the memory bus 632 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 612 and the I/O bus 614 are shown as single respective units, the computer system 600 may, in some embodiments, contain multiple I/O bus interface units 612, multiple I/O buses 614, or both. Further, while multiple I/O interface units are shown, which separate the I/O bus 614 from various communications paths running to the various I/O devices, in other embodiments some or all of the I/O devices may be connected directly to one or more system I/O buses.

In some embodiments, the computer system 600 may be a multi-user mainframe computer system, a single-user system, or a server computer or similar device that has little or no direct user interface but receives requests from other computer systems (clients). Further, in some embodiments, the computer system 600 may be implemented as a desktop computer, portable computer, laptop or notebook computer, tablet computer, pocket computer, telephone, smart phone, mobile device, or any other appropriate type of electronic device.

It is noted that FIG. 6 is intended to depict the representative major components of an exemplary computer system 600. In some embodiments, however, individual components may have greater or lesser complexity than as represented in FIG. 6, components other than or in addition to those shown in FIG. 6 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method, comprising:
   receiving by a processor unencrypted sensitive data, specified as a particular data type in application source code, with instructions compiled from the application source code for the particular data type to encrypt the sensitive data for writing to a live memory, the live memory including unencrypted nonsensitive data;
   determining that the data comprises the sensitive data based on one or more tags included with the sensitive data comprising sensitive data type information;
   requesting a different encryption key from a key manager for each instance of the sensitive data;
   receiving the encryption key, the encryption key associated with the sensitive data; and
   preventing an unencrypted form of the sensitive data from being stored in the live memory, wherein the preventing includes:
   encrypting the sensitive data using the encryption key;
   writing the encrypted sensitive data to the live memory;
   storing the different encryption key in an encryption key database for each instance of sensitive data; and
   storing a sensitive data type identifier associated with the different encryption key in the encryption key database.

2. The method of claim 1, further comprising:
   retrieving the encrypted sensitive data from the live memory;
   requesting a decryption key from the key manager, the decryption key associated with an instance of the sensitive data of the particular type;
   receiving the decryption key;
   decrypting the encrypted sensitive data using the decryption key; and
   executing an operation using the decrypted sensitive data.

3. The method of claim 1, further comprising:
   determining, based on the one or more tags, a sensitive data type of the sensitive data; and
   wherein:
   the requesting comprises sending a request to the key manager, the request including the sensitive data type; and
   the encryption key is associated with the sensitive data type.

4. The method of claim 3, wherein the sensitive data type is one of a financial data type, personal information data type, and a medical data type.

5. The method of claim 1, further comprising:
   storing a timestamp in the encryption key database, the timestamp associated with a first use of the encryption key;
   determining an age of the encryption key based on comparing a current time and current date to a time and to a date identified in the timestamp;
   determining whether the age of the encryption key is greater than a threshold age; and
   responsive to a determination that the age of the encryption key is greater than the threshold age:
   generating a new encryption key;
   generating a new timestamp based on a current date and time;
   overwriting the encryption key with the new encryption key; and
   overwriting the timestamp with the new timestamp.

6. A system, comprising:
   a live memory, the live memory including unencrypted nonsensitive data;
   a central processing unit (CPU), the CPU configured to:
   receive unencrypted sensitive data, specified as a particular data type in application source code, with instructions compiled from the application source code for the particular data type to encrypt the sensitive data for writing to the live memory;
   determine that the data comprises the sensitive data based on one or more tags included with the sensitive data comprising sensitive data type information;
   determine a different encryption key for each instance of the sensitive data, the encryption key associated with the sensitive data; and
   prevent an unencrypted form of the sensitive data from being stored in the live memory, wherein the preventing includes:
   encrypting the sensitive data based on the encryption key;
   writing the encrypted sensitive data to the live memory;
   store the different encryption key in an encryption key database for each instance of sensitive data; and
   store a sensitive data type identifier associated with the different encryption key in the encryption key database.

7. The system of claim 6, wherein the CPU is further configured to:
   retrieve the encrypted sensitive data from the live memory;
   determine a decryption key, the decryption key associated with the sensitive data; and
   decrypt the encrypted sensitive based on the decryption key.

8. The system of claim 6, wherein the CPU is further configured to determine, based on the one or more tags, a sensitive data type of the sensitive data, wherein the encryption key is associated with the sensitive data type.

9. The system of claim 8, wherein the sensitive data type is one of a financial data type, personal information data type, and a medical data type.

10. The system of claim 6, wherein the CPU is further configured to:
    store a timestamp in the encryption key database, the timestamp associated with a first use of the encryption key;
    store a threshold age in the encryption key database;
    determine an age of the encryption key based on comparing a current time and current date to a time and to a date identified in the timestamp;
    determine whether the age of the encryption key is greater than the threshold age; and responsive to a determination that the age of the encryption key is greater than the threshold age:
generate a new encryption key;
generate a new timestamp based on a current date and time;
overwrite the encryption key with the new encryption key; and
overwrite the timestamp with the new timestamp.

11. A computer program product, the computer program product comprising a computer readable storage medium having program instructions embodied therewith, the program instructions executable by a computer to cause the computer to:
receive unencrypted sensitive data, specified as a particular object type in application source code, with instructions compiled from the application source code for the particular object type to encrypt the sensitive data for writing to a live memory, the live memory including unencrypted nonsensitive data;
determine that the data comprises the sensitive data based on one or more tags included with the sensitive data comprising sensitive data type information;
determine a different encryption key for each instance of the sensitive data, the encryption key associated with the sensitive data; and
prevent an unencrypted form of the sensitive data from being stored in the live memory, wherein the preventing includes:
encrypting the sensitive data based on the encryption key;
writing the encrypted sensitive data to the live memory;
store the different encryption key in an encryption key database for each instance of sensitive data; and
store a sensitive data type identifier associated with the different encryption key in the encryption key database.

12. The computer program product of claim 11, wherein the instructions further cause the computer to:
retrieve the encrypted sensitive data from the live memory;
determine a decryption key, the decryption key associated with the sensitive data; and
decrypt the encrypted sensitive based on the decryption key.

13. The computer program product of claim 11, wherein the instructions further cause the computer to determine, based on the one or more tags, a sensitive data type of the sensitive data, wherein the encryption key is associated with the sensitive data type.

14. The computer program product of claim 11, wherein the instructions further cause the computer to:
store a timestamp in the encryption key database, the timestamp associated with a first use of the encryption key;
store a threshold age in the encryption key database;
determine an age of the encryption key based on comparing a current time and current date to a time and to a date identified in the timestamp;
determine whether the age of the encryption key is greater than the threshold age; and
responsive to a determination that the age of the encryption key is greater than the threshold age:
generate a new encryption key;
generate a new timestamp based on a current date and time;
overwrite the encryption key with the new encryption key; and
overwrite the timestamp with the new timestamp.

* * * * *